(12) United States Patent  (10) Patent No.: US 7,431,154 B2
Perez et al.  (45) Date of Patent: *Oct. 7, 2008

(54) SECURITY STORAGE CONTAINER (75) Inventors: Jose E. Perez, Bellflower, CA (US);
Gary J. Gwizdala, Rolling Hills Estates, CA (US); Kent Ke Yan, Buena Park, CA (US); William Randall Fisher, Torrance, CA (US); Edwin E. Pessara, Pacific Palisades, CA (US); Iris Gluzman, Westchester, CA (US)

(73) Assignee: Panasonic Disk Manufacturing Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/415,519

(22) Filed: May 2, 2006

(65) Prior Publication Data

US 2006/0196790 A1 Sep. 7, 2006

Related U.S. Application Data

(63) Continuation of application No. 10/792,215, filed on Mar. 4, 2004, now Pat. No. 7,051,874, which is a continuation of application No. 10/052,455, filed on Jan. 17, 2002, now Pat. No. 6,719,133.

(60) Provisional application No. 60/346,122, filed on Oct. 19, 2001.

(51) Int. Cl.
*B65D 85/57* (2006.01)

(52) U.S. Cl. .................. 206/308.2; 206/308.1; 206/1.5

(58) Field of Classification Search .................. 206/1.5, 206/308.1, 308.2, 310, 387.13; 220/780, 220/835

See application file for complete search history.

(56) References Cited

U.S. PATENT DOCUMENTS

| 4,011,940 | A | * | 3/1977 | Neal et al. ..................... 206/1.5 |
| 4,102,452 | A | * | 7/1978 | Sato et al. ............. 206/387.13 |
| 4,344,646 | A | | 8/1982 | Michel ........................ 292/87 |
| 4,746,008 | A | | 5/1988 | Heverly et al. ............... 206/1.5 |
| 4,834,238 | A | | 5/1989 | Hehn et al. .................. 206/387 |
| 4,865,190 | A | | 9/1989 | Gregerson et al. .......... 206/309 |
| 4,871,065 | A | | 10/1989 | Hehn et al. .................. 206/387 |
| 5,211,283 | A | | 5/1993 | Weisburn et al. ............. 206/1.5 |

(Continued)

*Primary Examiner*—David T Fidel
(74) *Attorney, Agent, or Firm*—Fountain Law Group, Inc.; George L. Fountain (57) ABSTRACT

A storage container includes a lid having a lid panel and an arm extending from the lid panel, the arm including a detent having a first surface parallel to the lid panel and a second surface having a taper extending at least a portion between the first surface and a distal end of the arm, and a base configured to receive a disc, the base having a base panel and a member extending from the base panel, the member having an opening defined by an interior surface having a portion thereof parallel to the base panel, the first surface of the detent engaging the interior surface portion of the member when the storage container is closed. It is emphasized that this abstract is provided to comply with the rules requiring an abstract which will allow a searcher or other reader to quickly ascertain the subject matter of the technical disclosure. It is submitted with the understanding that it will not be used to interpret or limit the scope or the meaning of the claims.

17 Claims, 8 Drawing Sheets

U.S. PATENT DOCUMENTS

| | | | |
|---|---|---|---|
| 5,215,188 A | 6/1993 | Wittman | 206/1.5 |
| 5,285,918 A | 2/1994 | Weisburn et al. | 220/265 |
| 5,297,672 A | 3/1994 | MacTavish | 206/1.5 |
| 5,305,873 A | 4/1994 | Joyce | 206/1.5 |
| 5,417,319 A | 5/1995 | Chalberg et al. | 206/1.5 |
| 5,460,266 A | 10/1995 | Mundorf et al. | 206/309 |
| 5,509,528 A | 4/1996 | Weisburn | 206/45.24 |
| 5,575,399 A | 11/1996 | Intini | 220/835 |
| 5,597,068 A | 1/1997 | Weisburn et al. | 206/308.1 |
| 5,645,167 A | 7/1997 | Conrad | 206/361 |
| 5,662,218 A | 9/1997 | Ladwig | 206/313 |
| 5,682,991 A | 11/1997 | Lammerant et al. | 206/308.1 |
| 5,718,332 A | 2/1998 | Tachibana | 206/308.2 |
| 5,762,187 A | 6/1998 | Belden, Jr. et al. | 206/308.2 |
| 5,769,218 A | 6/1998 | Yabe | 206/308.2 |
| 5,779,039 A | 7/1998 | Ambrus | 206/308.2 |
| 5,782,350 A | 7/1998 | Weisburn et al. | 206/308.2 |
| 5,782,352 A | 7/1998 | Senda | 206/308.3 |
| 5,788,068 A | 8/1998 | Fraser et al. | 206/310 |
| 5,823,341 A | 10/1998 | Nakasuji | 206/387.11 |
| 5,878,878 A | 3/1999 | Wu | 206/307 |
| 5,899,327 A | 5/1999 | Sykes | 206/307 |
| 5,901,840 A | 5/1999 | Nakasuji | 206/1.5 |
| 5,904,246 A | 5/1999 | Weisburn et al. | 206/308.2 |
| 5,931,291 A | 8/1999 | Sedon et al. | 206/1.5 |
| 5,934,114 A | 8/1999 | Weisburn et al. | 70/57.1 |
| 5,944,173 A | 8/1999 | Boire et al. | 206/1.5 |
| 5,944,181 A | 8/1999 | Lau | 206/308.1 |
| 5,944,185 A | 8/1999 | Burdett et al. | 206/387.11 |
| 5,988,375 A | 11/1999 | Chang | 206/308.1 |
| 5,988,376 A | 11/1999 | Lax | 206/308.2 |
| 5,996,788 A | 12/1999 | Belden, Jr. et al. | 206/310 |
| 6,070,722 A | 6/2000 | Ng | 206/308.1 |
| 6,076,667 A | 6/2000 | Ambrus | 206/308.2 |
| 6,082,156 A | 7/2000 | Bin | 70/57.1 |
| 6,102,200 A | 8/2000 | Dressen et al. | 206/308.2 |
| 6,119,857 A | 9/2000 | Stumpff | 206/308.1 |
| 6,135,280 A | 10/2000 | Burdett et al. | 206/387.11 |
| 6,155,087 A | 12/2000 | Necchi | 70/57.1 |
| 6,155,417 A | 12/2000 | Flores, Jr. et al. | 206/308.1 |
| 6,164,446 A | 12/2000 | Law | 206/308.1 |
| 6,196,384 B1 | 3/2001 | Belden, Jr. | 206/308.1 |
| 6,206,185 B1 | 3/2001 | Ke et al. | 206/308.1 |
| 6,206,186 B1 | 3/2001 | Cerda-Vilaplana et al. | 206/308.1 |
| 6,398,022 B1 | 6/2002 | Mou et al. | 206/308.1 |
| 6,478,150 B1 | 11/2002 | S.o slashed.lling | 206/308.1 |
| 6,832,686 B2 | 12/2004 | Donegan | 206/531 |

* cited by examiner

SECURITY STORAGE CONTAINER

CROSS-REFERENCE TO RELATED APPLICATIONS

The present application is a continuation of patent application Ser. No. 10/792,215, filed on Mar. 4, 2004, which, in turn, is a continuation of patent application Ser. No. 10/052,455, filed on Jan. 17, 2002, now U.S. Pat. No. 6,719,133 which, in turn, claims priority to Provisional Patent Application No. 60/346,122, filed on Oct. 19, 2001, all of which are incorporated herein by reference.

BACKGROUND

1. Field of the Invention

The present invention relates generally to storage containers, and more particularly, to storage containers for recorded media.

2. Background of the Invention

In recent years, optical discs have emerged as one of the most popular mediums for storing audio, video and computer information. To accommodate the wholesale and retail distribution of the disc, numerous storage containers have been developed. These storage containers typically include a base supporting a central hub to engage an ~aperture in the center of the disc. The base is generally hinged to a lid so as to open and close the storage container like a book. This design is well suited for use by the consumer, but may pose certain security risks in the retail environment. In the recent years, retailers have reported numerous incidents of theft involving the unauthorized removal of discs from the their storage containers. Labels and shrink wrap have been proposed in the past as a way to deal with this problem. However, these proposals have had limited success because of the ease at which labels and shrink wrap can be opened with a sharp item. Accordingly, there is a need for a storage container which is designed to discourage theft in the retail environment.

SUMMARY

In one aspect of the present invention, a storage container includes a lid having a lid panel and an arm extending from the lid panel, the arm including a detent having a first surface parallel to the lid panel and a second surface having a taper extending at least a portion between the first surface and a distal end of the arm, and a base configured to receive a disc, the base having a base panel and a member extending from the base panel, the member having an opening defined by an interior surface having a portion thereof parallel to the base panel, the first surface of the detent engaging the interior surface portion of the member when the storage container is closed.

In another aspect of the present invention, a storage container includes a lid, a base configured to receive a disc, and means for latching the lid to the base to close the storage container.

In yet another aspect of the present invention, a storage container includes a lid, a base having an annular wall configured to support an outer periphery of a disc, means for latching the lid to the base to close the storage container, means for clamping the outer periphery of the disc to the annular wall when the storage container is closed, and means, coupled to the lid, for preventing the disc from sliding out of the storage container.

It is understood that other aspects of the present invention will become readily apparent to those skilled in the art from the following detailed description, wherein is shown and described only exemplary embodiments of the invention, simply by way of illustration. As will be realized, the invention is capable of other and different embodiments, and its several details are capable of modifications in various respects, all without departing from the invention. Accordingly, the drawings and description are to be regarded as illustrative in nature, and not as restrictive.

BRIEF DESCRIPTION OF THE DRAWINGS

Aspects of the present invention are illustrated by way of example, and not by way of limitation, in the accompanying drawings in which like reference numerals refer to similar elements.

DETAILED DESCRIPTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other embodiments. The detailed description sets forth the inventive concepts in terms of construction and function of the exemplary storage containers. It is to be understood, however, that the same, equivalent, and alternative constructions and functions may be accomplished with other storage containers which are also intended to be encompassed within the spirit and scope of the invention.

As used herein, the term "optical disc" or "disc" means any compact disc (CD), compact disc read only memory (CD- ROM), recordable compact disc (CD-R), rewriteable compact disc (CD-RW), digital video disc or digital versatile disc (DVD), recordable digital video disc or recordable digital versatile disc (DVD-R), digital video disc random access memory or digital versatile disc random access (DVD-RAM), as well as other similar media which is used for storing information.

Figures 1, 1A, 1B:
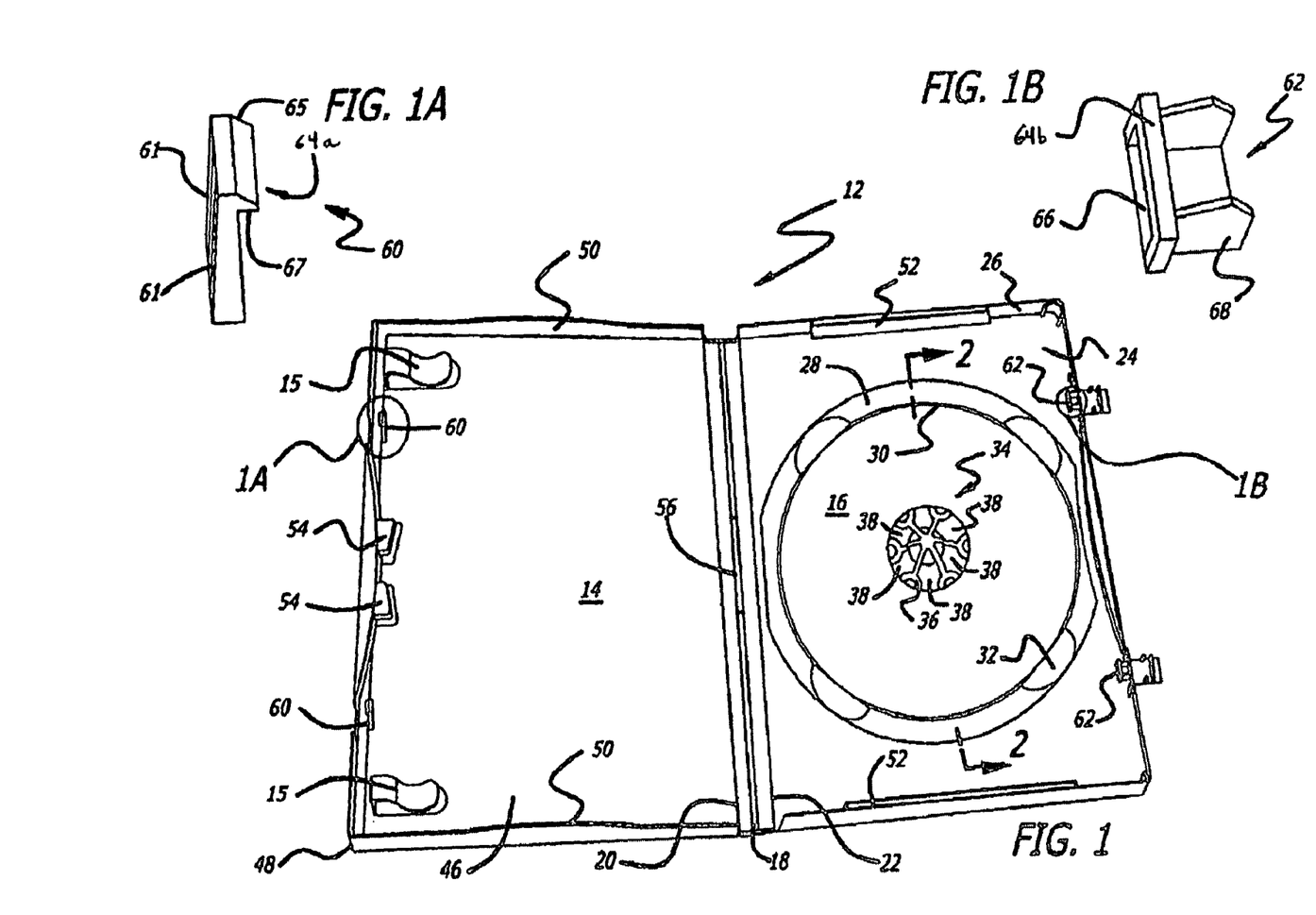
FIG. 1 is a perspective view of an exemplary storage container.
FIG. 1A is a blow up of a portion of the exemplary storage container of FIG. illustrating the detail of a tab.
FIG. 1B is a blow up of a portion of the exemplary storage container of FIG. 1 illustrating the details of a catch.

A perspective view of an exemplary storage container is shown in FIG. 1. The exemplary storage container includes several security features that are particularly useful for these types of containers in the retail environment. However, as those skilled in the art will appreciate, these security features are equally applicable to any type of storage container regardless of the contents. In the described exemplary embodiment, the storage container comprises a housing 12 including a lid 14 and a base 16. The lid 14 may include a pair of clips 15 to hold pamphlets, brochures, booklets, or other printed media. The lid 14 can be attached to the base 16 in a variety of ways. By way of example, a hinge panel 18 can be attached to the lid 14 with a first living hinge 20 and attached to the base 16 with a second living hinge 22. Various other means for attaching the lid 14 to the base 16 will be readily apparent to those skilled in the art.

The base 16 includes a base panel 24 with a peripheral base wall 26 extending along the three sides of the base panel not attached to the living hinge 22. The base panel 24 includes an annular wall 28 to support the disc away from the base panel 24. The annular wall 28 can be designed with a seat 30 that supports the unrecorded outer edge of the disc. The annular wall 28 may further be equipped with any number of finger holes to facilitate the removal of the disc from the storage container. In the described exemplary embodiment, there are four finger holes 32 equally spaced from one another along the circumference of the annular wall 28. However, as those skilled in the art will readily appreciate, any number of finger holes can be used depending on the particular design requirements and manufacturing specifications. The finger hole design can take on various forms. By way of example, convex or semi-circular recesses in the annular wall 28 can be used to provide easy access to the periphery of the disc during the removal process.

Figure 2:
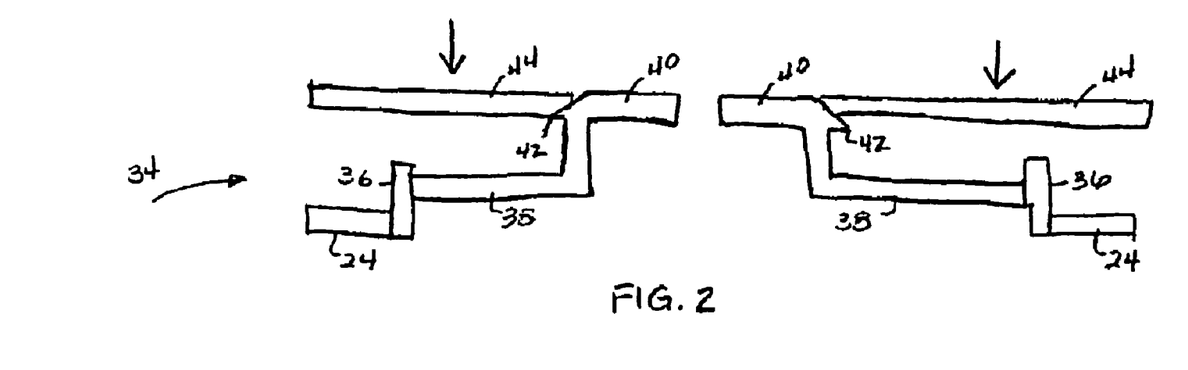
FIG. 2 is a cross-section view of the exemplary storage container of FIG. 1 taken along line 2 with a disc shown prior to engagement with a hub.
Figure 3:
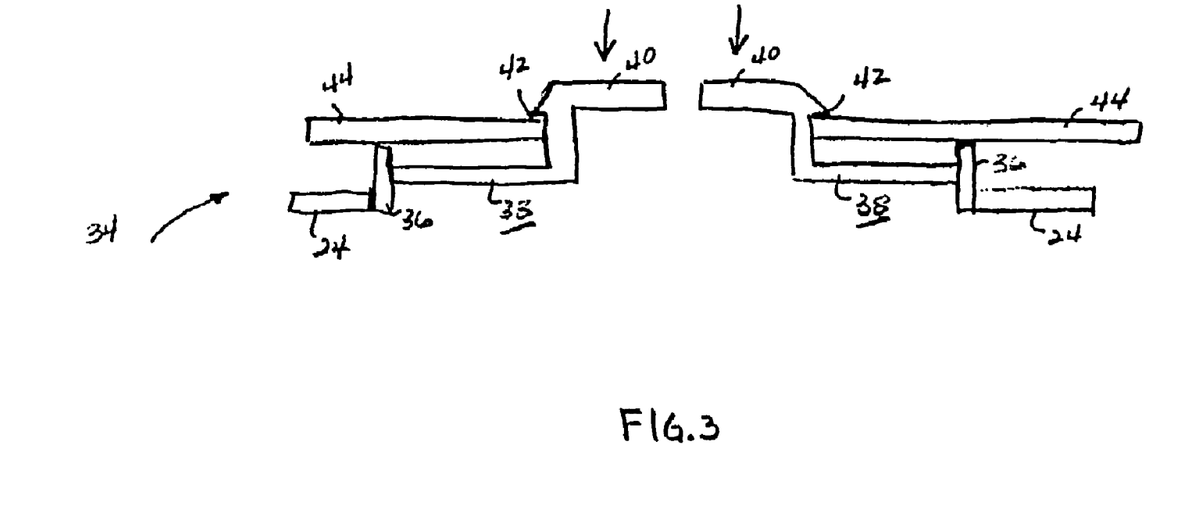
FIG. 3 is a cross-section view of the exemplary storage container of FIG. 1 taken along line 2 with a disc shown in engagement with the hub.

A retaining member 34 extending upward from base panel 24 can be used to engage the central aperture of the disc. The retaining member 34 can be designed in any fashion that sufficiently retains the disc in the storage container. One such design includes an annular ring 36 which supports the unrecorded inner edge of the disc adjacent the central aperture. The annular ring 36 and the annular wall 28 cooperate to maintain the disc in the storage container away from the base panel 24. Cantilevered from the annular ring 36 are six inwardly extending radial arms 38 which collectively form a hub. As best seen in FIGS. 2 and 3, the hub includes an upper surface 40 with an outwardly extending lip 42 which overlies the unrecorded inner edge of the disc when retained by the hub.

To engage the disc with the retaining member 34, the disc is placed inside the storage container with its outer edge over the seat 30 of the annular wall 28 and its center aperture over the upper surface 40 of the hub (see FIG. 1). The placement of the disc over the hub prior to engagement is shown in FIG. 2. The disc 44 can be manually pressed by the user toward the base panel 24 until the inner edge of the disc 44 defining the center aperture slides over the lip 40 and into engagement with the hub as shown in FIG. 3. Referring to FIG. 3, the disc 44 can be removed from the retaining member 34 by applying a downward force to the upper surface 40 of the hub to force the lip 40 downward through the center aperture of the disc to free the disc from the retaining member 34. An attractive feature of the retaining member design is that the annular ring 36 prevents the downward movement of the inner edge of the disc 44 despite any downward movement of the hub. This approach prevents the disc 44 from being damaged due to undesirable flexing of the disc 44 during removal.

Referring back to FIG. 1, the lid 14 includes a lid panel 46 with a peripheral lid wall 48 extending along the three sides of the lid panel 46 not attached to the living hinge 20. A lip 50 can be formed at a distal end of an interior portion of the peripheral lid wall 48 on each side of the storage container. A rail 52 can be positioned on each side of the storage container along the base panel 24 each which cooperates with the peripheral base wall 26 to form a nesting slot for a respective one of the lips 50. In at least one embodiment of the storage container, the lips 50 can be configured with a concave design that extends close to or all the way to the base panel 24 when the storage container is in the closed position. This arrangement may prevent the disc from sliding out of the storage container should the disc become dislodged. The concave design of the lips 50 may also make it more difficult for one to remove the disc from the storage container through a gap between the peripheral base and lid walls when the storage container is in the closed position. These attendant benefits may be achieved with other lip designs without departing from the inventive concepts described herein. By way of example, the lips 50 can be rectangular, triangular, or any other design which covers at least a portion of the gap formed between the peripheral base and lid walls when the storage container is in the closed position.

The storage container may be equipped with additional features that maintain the disc in engagement with the hub during transportation and handling of the closed storage container. The lid 14 may include tabs 54 which engage the outer edge of the disc when the storage container is in the closed position. Each tab can be supported by the lid panel 46 and includes a surface which extends inwards toward the center of the lid 14 and away from the peripheral lid wall 48. Alternatively, each tab can be configured as a flat member extending directly from the front portion of the peripheral lid wall 48 inward toward the center of the lid 14.

The tabs 54 can be designed to work alone, or alternatively, in combination with other structures to maintain the disc in engagement with the hub when the storage container is in the closed position. By way of example, the hinge panel 18 can be configured with a reinforcing rib 56 that not only increases the structural strength of the hinge panel 18, but can be used to further maintain the disc in engagement with the hub when the storage container is in the closed position. This can be accomplished with a variety of rib designs depending on the aesthetic criteria for the storage container. By way of example, the reinforcing rib 56 can extend inwardly from the hinge panel 18 a sufficient length such that, when the storage container is in the closed position, the reinforcing rib 56 extends over the annular wall 28 and engages the unrecorded upper surface of the disc. The reinforcing rib 56 can be designed with a semi-circular recess or convex configuration for alignment with the seat 30 of the annular wall 28 to avoid placing undue stress on portions of the disc unsupported by the seat 30.

Figure 4:
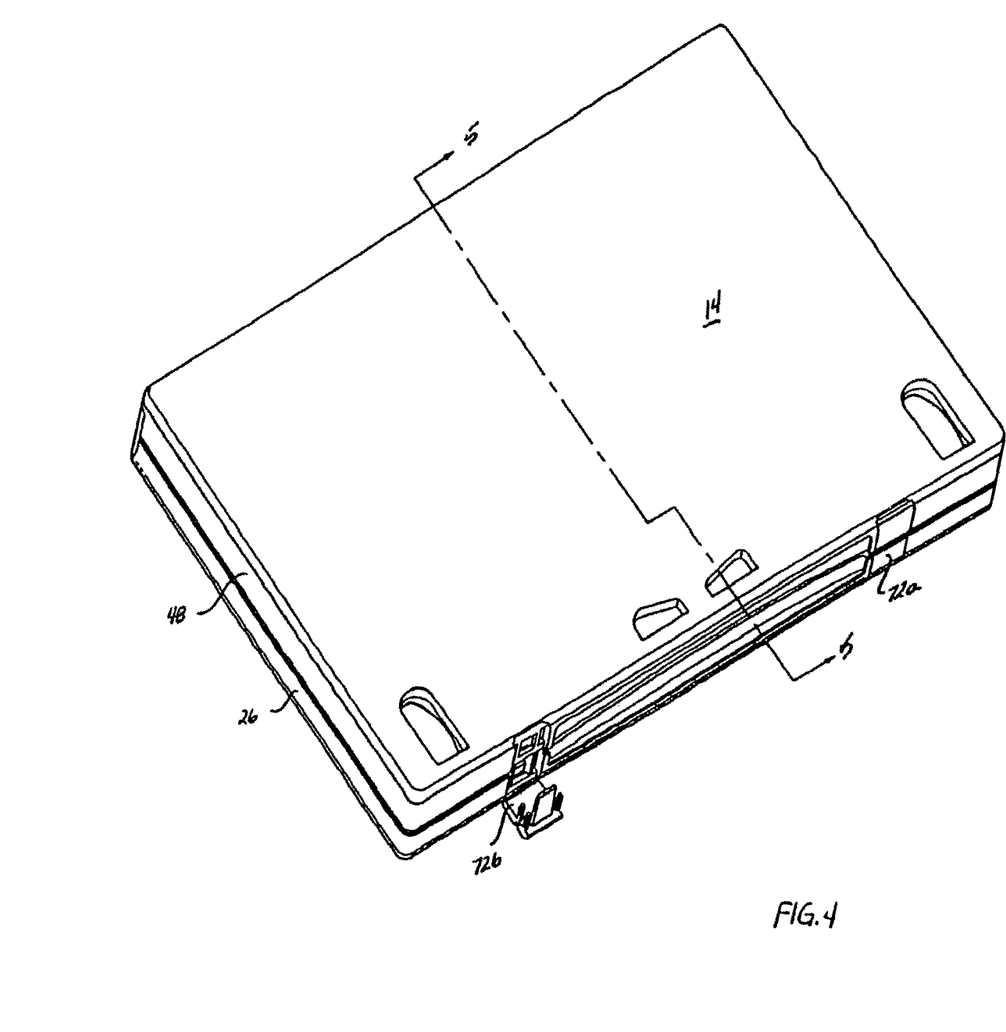
FIG. 4 is a perspective view of an exemplary storage container in the closed position.

FIG. 4 is a perspective view of an exemplary storage container in the closed position.

Figure 5:
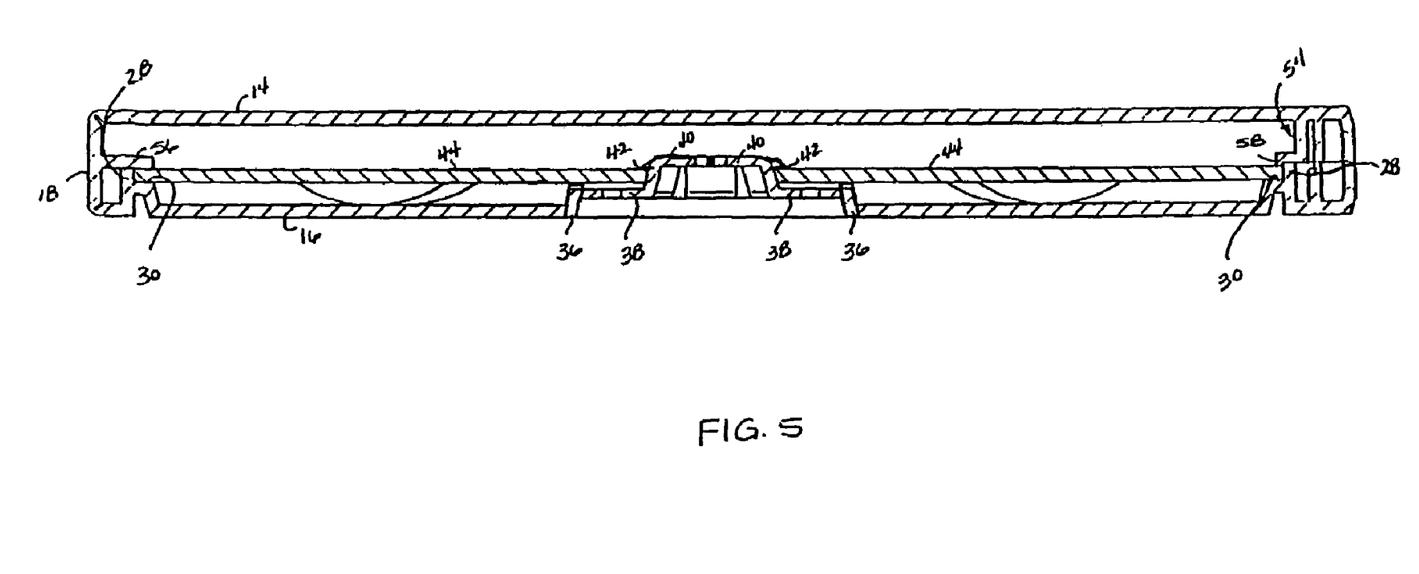
FIG. 5 is a cross-section view of the exemplary storage container of FIG. 4 taken along lines 5.

FIG. 5 is a cross-section view of the exemplary storage container of FIG. 4 taken along line 5. The manner in which the reinforcing rib 56 cooperates with the tabs 54 of the lid 14 to effectively clamp the outer edge of the disc to the seat 30 of the annular wall 28 is shown in FIG. 5. In at least one embodiment of the storage container, the tab 54 can be formed with a 58 at its distal end. As shown in FIG. 5, with the storage container in the closed position, the tab 54 extends over the annular wall 28 of the base panel 24 such that the ridge 58 engages the unrecorded upper surface of the disc to securely lodge the disc between the ridge 58 and the seat 30 of the annular wall 28. In a similar manner to the reinforcing rib 56, the ridge 58 can be formed with an arc shape that is aligned with the seat 30 of the annular wall 28 when the storage container is in the closed position to avoid flexing the disc by placing a downward force on a portion of the disc unsupported by the seat 30. The ridge design minimizes surface contact between the tabs and the disc. In addition, the ridge design may provide for a tighter grip on the disc since the tabs have to be located sufficiently above the disc when the storage container is in the closed position to clear the annular wall 28. Alternatively, the tabs can be used to directly to secure the disc to the seat 30 of the annular wall 28.

The storage container may also be equipped with a latching mechanism to discourage the unauthorized removal of the disc from the storage container during retail distribution. The latching mechanism may take on various forms depending on the overall design constraints and security objectives. By way of example, the latching mechanism can be designed in a manner that requires a significant amount of force to open the storage container. Numerous techniques may be employed to implement this type of latching mechanism. These techniques can range from a single latch to any number of latches working together to achieve a storage container which cannot be easily open without exerting considerable force.

An exemplary latching mechanism for a storage container is shown in FIG. 1. The exemplary latching mechanism includes tabs 60 supported by the lid 14 in combination with catches 62 supported by the base 16. The tabs 60 can be designed in various fashions depending on the design specifications and other relevant factors. In the described exemplary embodiment, the tabs 60 are fairly rigid members supported by the lid panel 46. Increased rigidity may be achieved with a pair of reinforcing ribs 61 on each of the tabs 60. As best seen by FIG. 1A, a detent 64a can be located at the distal end of the tab 60. The detent 64a includes a tapered surface 65 with an undercut wall 67. The catches 62 are also fairly rigid members extending from the base panel 24 (see FIG. 1). As best seen in FIG. 1B, the catch 62 includes a catch member 64b with an aperture 66 formed therein for catching the detent 64a of the tab 60 when the storage container is being closed. A support member 68 extending upward from the base panel between the aperture 66 and the peripheral base wall 26 is used to maintain rigidity of the catch 62 when the storage container is being opened and closed.

Figure 6:
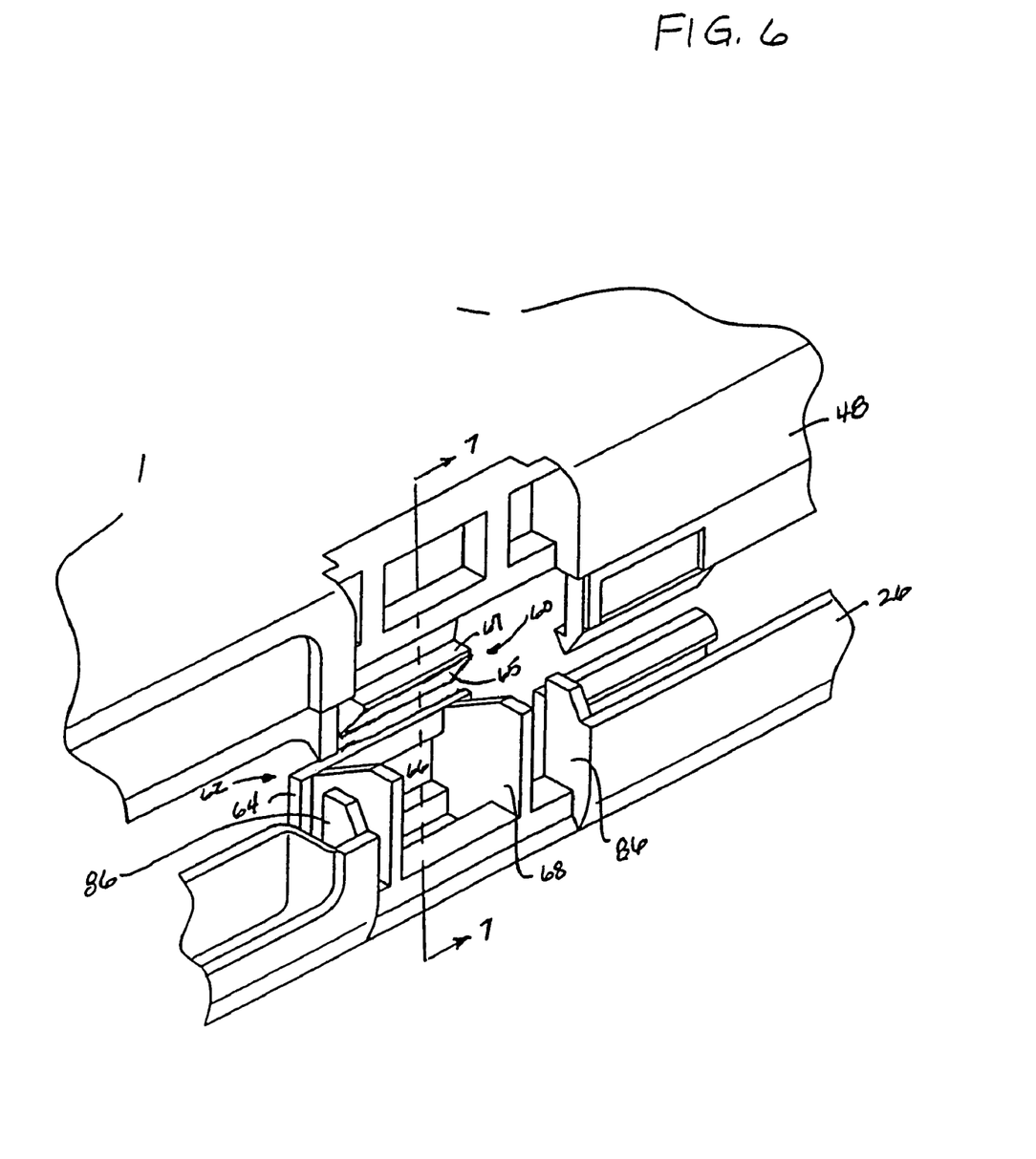
FIG. 6 is a perspective view of a portion of an exemplary storage container illustrating the details of a tab and catch latching mechanism.
Figure 7:
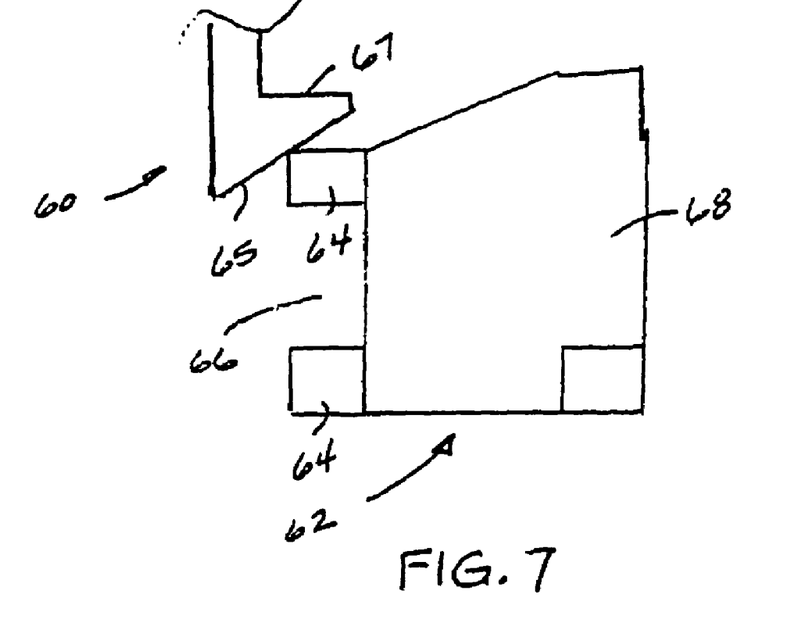
FIG. 7 is a cross-section view of the tab and catch latching mechanism of FIG. 6 taken along line 7 showing the tab just prior to engagement with the catch.
Figure 8:
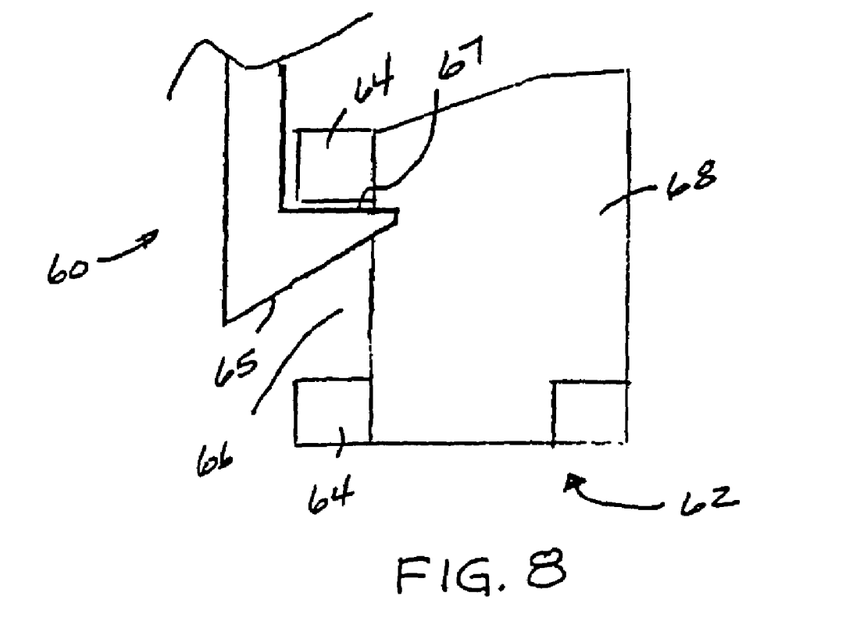
FIG. 8 is a cross-section view of the tab and catch latching mechanism of FIG. 6 taken along line 7 showing the tab engaged with the catch.

FIG. 6 is a perspective view of the tab and catch just prior to engagement as the exemplary storage container is being closed. FIG. 7 is a cross-section view of the exemplary storage container of FIG. 6 taken along line 7. As shown in FIGS. 6 and 7, when the storage container is being closed by the user, the tapered upper surface of the detent 65 comes into contact with the upper portion of the catch member 64. Since the tab 60 and the catch 62 are fairly rigid, the user must increase the force applied to the base and lid to bring them together to cause either the tab 60 to flex slightly backward and/or cause the catch member 64 to flex slightly forward against the support member 68 to allow the tapered upper surface of the detent 65 to slide past the exterior upper portion of the catch member 64 and snap into the aperture 66 with the undercut wall 67 facing the interior upper portion of the catch member 64 as shown in FIG. 8. FIG. 8 is a cross-section view of the exemplary storage container of FIG. 6 taken along line 7 with the exemplary storage container in the closed position. Because of the undercut wall 67 of the detent 60, the force to open the storage container is even greater than that required to close the storage container. To open the container, the user applies a force to the base and lid to separate them from one another. In a manner similar to that described in connection with the closing of the storage container, the applied force to the storage container must be sufficient to cause either the tab 60 to flex slightly backward and/or cause the catch member 64 to flex slightly forward against the support member 68. However, in this case, since the undercut wall 67 of the detent 64 is not tapered, the force required to flex the tab 60 backward and/or the catch member 64 forward against the support member 68 to allow the detent 64 to clear the catch member 64 and release it from the aperture is much greater. This increased force to open the storage container may discourage the unauthorized opening of the storage container in the retail environment.

The amount of force required to open and close the storage container can be varied by altering the design the reinforcing ribs on the tab or the support member for the catch. The tabs may be designed with a support member similar to that used for catches, either alone or in combination with the reinforcing ribs, to set the amount of force required to open and close the storage container. The rigidity of the material used for the tabs and catches can also be varied. One skilled in the art will readily be able to determine the material needed for the tabs and catches, and the designs of the supporting structures, if any, to meet the specific design requirements of any particular application.

Figure 9:
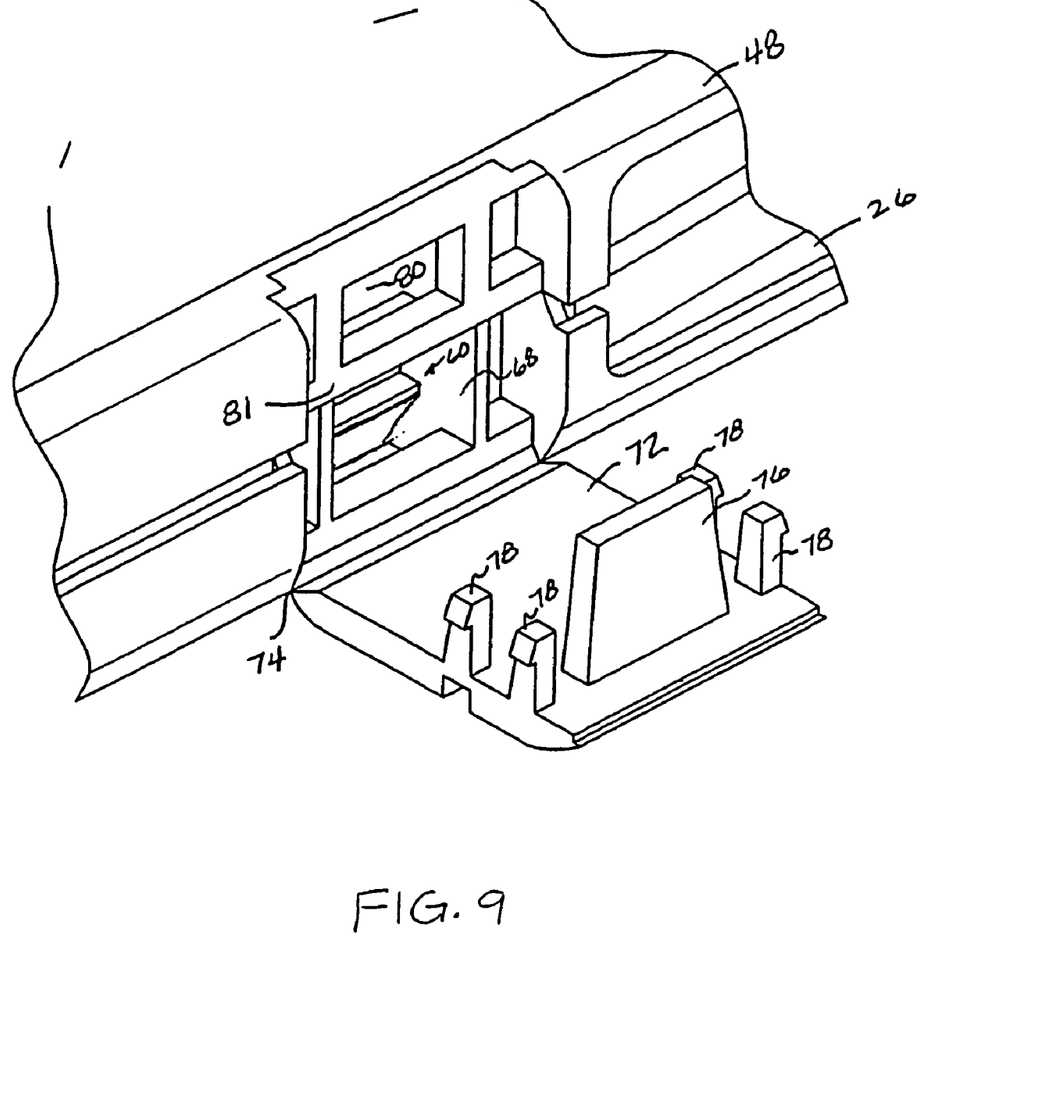
FIG. 9 is a perspective view of a portion of an exemplary storage container illustrating the details of a break away tab hinged to the storage container.

Returning to FIG. 4, the exemplary storage container can be configured with a pair of removable tabs 72a and 72b. During retail distribution of the storage container, the removable tabs are in the closed position as shown by the removable tab 72a. Once the storage container is removed from the retail environment, it can be opened by first moving removable tabs to the open position as shown by the removable tab 72b. Once the removable tabs are moved to the open position, the storage container can then be opened by separating the base 16 from the lid 14. As best shown in FIG. 9, the removable tab can be moved between the open and closed position via a breakaway hinge 74 connecting the removable tab to the base 16. The removable tab 72 is generally square or rectangular shape with an arm 76 extending from an interior portion of the removable tab. The removable tab 72 may also include four prongs 78 with two projecting from each side of the interior portion. When the removable tab 72 is in the closed position, the arm 76 extends through a center slot 80 formed in the peripheral lid wall 48 and the prongs 78 straddle a horizontal bar 81 extending through the peripheral lid wall 48. This configuration may provide heightened security in the retail environment by making it more difficult to open the storage container without authorization.

Figure 10:
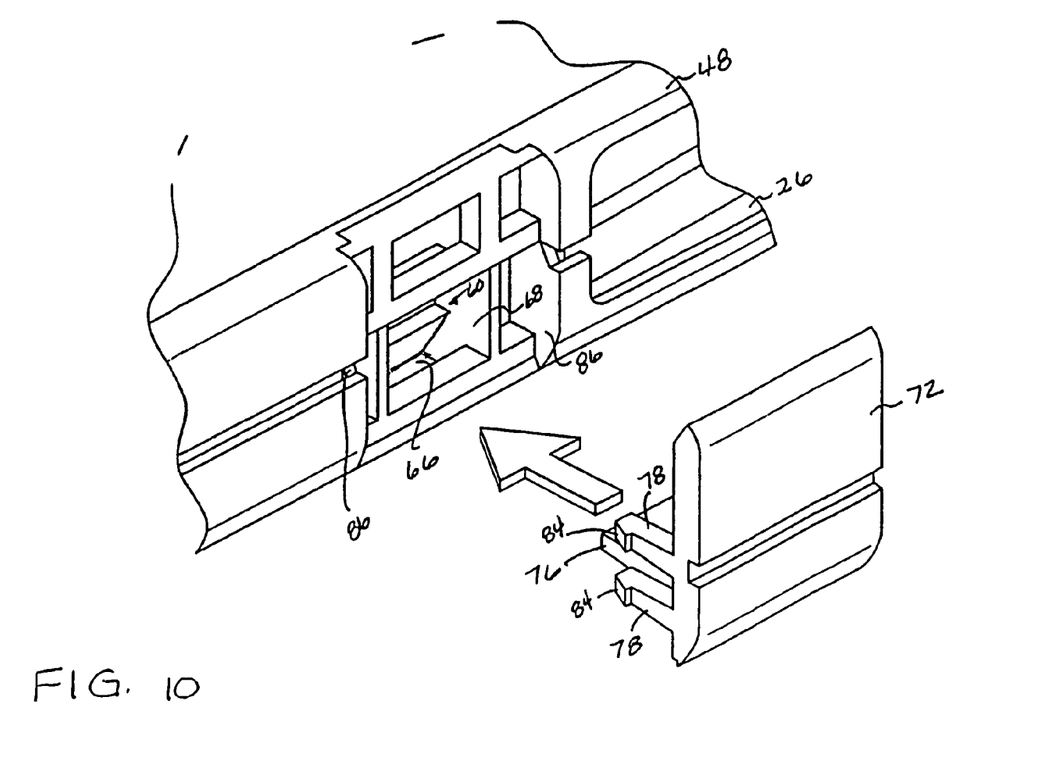
FIG. 10 is an exploded perspective view of the exemplary storage container of FIG. 9 illustrating the insertion of the break away tab into the exemplary storage container after the hinge connection is broken.

Once the storage container is removed from the retail environment by the consumer, the removable tab 72 can be opened and separated from the base 16 by applying an upward or twisting force to the removable tab 72 to break the hinge connection. The removable tab 72 can then be physically rotated 1800 with respect its original position and reinserted into the front portion of the peripheral lid and base walls as shown in FIG. 10. In this position, the arm 76 extends through the aperture 66 in the catch member 64 forcing the detent 64 of the tab 60 out of the aperture 66 to allow the consumer to easily open the storage container by merely applying a force to separate the base 16 from the lid 14 sufficient to overcome the insertion force of any other commonly known latches employed by the storage container. Each prong 78 may be formed with a detent 84 having a tapered surface with an undercut. When the removable tab 72 is being inserted into the front portion of the peripheral lid and base walls, the tapered portion of the detents 84 rides against interior walls 86 of the peripheral base wall 24 hereby flexing the prongs 78 toward one another. Once the detents 84 clear the interior walls 86, the prongs 78 revert to their non-flexed state with the undercut of the detents 84 engaging the ends of the interior walls 86. This arrangement holds the removable tabs in place once the hinges have been broken away from the base 16.

Returning to FIG. 4, the peripheral base and lid walls 24 and 48 can be formed with slightly concave portions in the front portion. This arrangement provides an area where one can grasp the base and lid to open the storage container. These concave portions may be particularly useful to a consumer opening a storage container that does not have removable tabs that disable the latching mechanism.

Although exemplary embodiments of the present invention has been described, it should not be construed to limit the scope of the appended claims. Those skilled in the art will understand that various modifications may be made to the described embodiments. By way of example, any feature of the exemplary storage containers can be employed alone or in combination with one or more features. Moreover, to those skilled in the various arts, the inventive features described throughout can be employed with storage containers for other devices such as video cassettes and the like. It is therefore desired that the present embodiments be considered in all respects as illustrative and not restrictive, reference being made to the appended claims rather than the foregoing description to indicate the scope of the invention.

What is claimed is:

1. A container for storing an optical disc, comprising:
   a lid comprising a lid panel and a peripheral lid wall situated along a periphery of said lid panel, wherein said peripheral lid wall extends substantially perpendicular to said lid panel, and wherein said peripheral lid wall includes a slot;
   a base comprising a base panel and a peripheral base wall situated along a periphery of said base panel, wherein said peripheral base wall extends substantially perpendicular to said base panel, and wherein said base panel includes a retaining member for securely receiving said optical disc;
   a hinge panel pivotally coupled to said lid and said base panel; and
   a detachable first tab adapted to securely lock said container when said container is in a closed position, wherein said detachable first tab comprises a first portion adapted to extend into said slot of said peripheral lid wall in a locked position, and a second portion pivotally attached to and detachable from said base;
   wherein said lid further comprises a second tab, and wherein said base further comprises a catch adapted to securely receive said second tab when said container is in said closed position.

2. The container of claim 1, wherein said detachable first tab is adapted to pivot about said second portion from said locked position to an unlocked position wherein said first portion of said detachable first tab is situated out of said slot of said peripheral lid wall.

3. The container of claim 1, wherein said detachable first tab includes one or more prongs including a detent adapted to engage with a portion of said peripheral lid wall and/or said base peripheral wall to securely hold said detachable first tab in said locked position.

4. The container of claim 1, wherein said catch comprises an aperture, and wherein said second tab includes a detent adapted to snap into said aperture to position said container in said closed position.

5. The container of claim 1, wherein said retaining member comprises an annular ring adapted to snap into a central opening of said optical disc.

6. A container for storing and optical disk, comprising:
   a lid comprising a lid panel and a peripheral lid wall situated along a periphery of said lid panel, wherein said peripheral lid wall extends substantially perpendicular to said lid panel, and wherein said peripheral lid wall includes a slot;
   a base comprising a base panel and a peripheral base wall situated along a periphery of said base panel, wherein said peripheral base wall extends substantially perpendicular to said base panel, and wherein said base panel includes a retaining member for securely receiving said optical disc;
   a hinge panel pivotally coupled to said lid and said base panel; and
   a detachable first tab adapted to securely lock said container when said container is in a closed position, wherein said detachable first tab comprises a first portion adapted to extend into said slot of said peripheral lid wall in a locked position, and a second portion pivotally attached to and detachable from said base;
   wherein said base panel comprises an annular wall adapted to support a peripheral region of said optical disc.

7. The container of claim 6, wherein said lid comprises a second tab, and said hinge panel comprises a reinforcing rib, wherein said peripheral region of said optical disc is sandwiched between said annular wall, and said second tab and said reinforcing rib, when said container is in said closed position.

8. A container for storing an optical disc, comprising:
   a first closing member comprising a first panel and a first peripheral wall situated along a periphery of said first panel, wherein said first peripheral wall extends substantially perpendicular to said first panel, and wherein said first peripheral wall includes a slot,
   a second closing member comprising a second panel and a second peripheral wall situated along a periphery of said second panel, wherein said second peripheral wall extends substantially perpendicular to said second panel
   a hinge panel pivotally coupled to said first and second panels;
   a detachable first tab adapted to securely lock said container when said container is in a closed position, wherein said detachable first tab comprises a first portion adapted to extend into said slot of said first peripheral wall in a locked position, and a second portion pivotally attached to and detachable from said second closing member; and
   a retaining member for securely receiving said optical disc;
   wherein said first closing member further comprises a second tab; and wherein said second closing member further comprises a catch adapted to securely receive said second tab when said container is in said closed position.

9. The container of claim 8, wherein said detachable first tab is adapted to pivot about said second portion from said locked position to an unlocked position wherein said first portion of said detachable first tab is situated out of said slot of said first peripheral wall.

10. The container of claim 8, wherein said detachable first tab includes one or more prongs including a detent adapted to engage with a portion of said first peripheral wall and/or said second peripheral wall to securely hold said detachable first tab in said locked position.

11. The container of claim 8, wherein said catch comprises an aperture, and wherein said second tab includes a detent adapted to snap into said aperture to position said container in said closed position.

12. The container of claim 8, wherein said retaining member comprises an annular ring adapted to snap into a central opening of said optical disc.

13. A container for storing an optical disc, comprising:
a first closing member comprising a first panel and a first peripheral wall situated along a periphery of said first panel, wherein said first peripheral wall extends substantially perpendicular to said first panel, and wherein said first peripheral wall includes a slot,
a second closing member comprising a second panel and a second peripheral wall situated along a periphery of said second panel, wherein said second peripheral wall extends substantially perpendicular to said second panel
a hinge panel pivotally coupled to said first and second panels;
a detachable first tab adapted to securely lock said container when said container is in a closed position, wherein said detachable first tab comprises a first portion adapted to extend into said slot of said first peripheral wall in a locked position, and a second portion pivotally attached to and detachable from said second closing member; and
a retaining member for securely receiving said optical disc;
wherein said second panel includes said retaining member and further comprises an annular wall adapted to support a peripheral region of said optical disc.

14. The container of claim 13, wherein said first closing member comprises a second tab, and said hinge panel comprises a reinforcing rib, wherein said peripheral region of said optical disc is sandwiched between said annular wall, and said second tab and said reinforcing rib, when said container is in said closed position.

15. The container of claim 8, wherein said first closing member comprises a lid, and said second closing member comprises a base.

16. A container for storing an optical disc, comprising:
a lid comprising a lid panel and a peripheral lid wall situated along a periphery of said lid panel, wherein said peripheral lid wall extends substantially perpendicular to said lid panel, and wherein said peripheral lid wall includes a slot;
a base comprising a base panel and a peripheral base wall situated along a periphery of said base panel, wherein said peripheral base wall extends substantially perpendicular to said base panel, and wherein said base panel includes a retaining member for securely receiving said optical disc;
a hinge panel pivotally coupled to said lid and said base panel; and
a detachable first tab adapted to securely lock said container when said container is in a closed position, wherein said detachable first tab comprises a first portion adapted to extend into said slot of said peripheral lid wall in a locked position, and a second portion pivotally attached to and detachable from said base;
wherein said detachable first tab is adapted to reinsert into said peripheral base wall and disengage a detent of said lid from a catch of said base.

17. A container for storing an optical disc, comprising:
a first closing member comprising a first panel and a first peripheral wall situated along a periphery of said first panel, wherein said first peripheral wall extends substantially perpendicular to said first panel, and wherein said first peripheral wall includes a slot,
a second closing member comprising a second panel and a second peripheral wall situated along a periphery of said second panel, wherein said second peripheral wall extends substantially perpendicular to said second panel;
a hinge panel pivotally coupled to said first and second panels;
a detachable first tab adapted to securely lock said container when said container is in a closed position, wherein said detachable first tab comprises a first portion adapted to extend into said slot of said first peripheral wall in a locked position, and a second portion pivotally attached to said second closing member; and
a retaining member for securely receiving said optical disc;
wherein said detachable first tab is adapted to reinsert into said first peripheral wall and disengage a detent of said second closing member from a catch of said first closing member.

* * * * *